Aug. 17, 1965 R. D. PEDERSEN 3,201,775

VOLTAGE PROXIMITY DETECTOR

Filed March 8, 1963 2 Sheets-Sheet 1

INVENTOR.
ROBERT D. PEDERSEN
BY
Dick, Zarley & Henderson
ATTORNEYS

WITNESS
NORMAN G. TRAVISS

Aug. 17, 1965 R. D. PEDERSEN 3,201,775

VOLTAGE PROXIMITY DETECTOR

Filed March 8, 1963 2 Sheets-Sheet 2

INVENTOR.
ROBERT D. PEDERSEN
BY
Dick, Zarley & Henderson
ATTORNEYS

WITNESS
NORMAN G. TRAVISS

United States Patent Office 3,201,775

Patented Aug. 17, 1965

3,201,775

VOLTAGE PROXIMITY DETECTOR

Robert D. Pedersen, Omaha, Nebr., assignor to Teale & Company, Omaha, Nebr., a partnership Filed Mar. 8, 1963, Ser. No. 263,899
7 Claims. (Cl. 340—258)

This invention relates to a voltage proximity detector and particularly to a transistorized model that is suitable for use on a crane for detection of the electrostatic field surrounding electrical power lines.

It is therefore an object of this invention to provide a voltage proximity detector having a wide range of sensitivity control.

It is a further object of this invention to provide a voltage proximity detector having an alarm device which will instantly sound upon the detector sensing a predetermined voltage level.

It is also an object of this invention to provide a voltage proximity detector having a probe voltage detector which will detect a radiated electric field.

It is a still further object of this invention to provide a voltage proximity detector which will give a warning in the event of failure of certain components of the system.

It is another object of this invention to provide a voltage proximity detector which is particularly well suited for detector approaching closer than a pre-determined distance to energized power lines.

It is another object of this invention to provide a voltage proximity detector which is particularly well suited for use on cranes for warning crane personnel that the crane has moved within the unsafe area adjacent high voltage electrical lines.

It is a further object of this invention to provide a transistorized voltage proximity detector capable of normal operation throughout varying moisture and temperature conditions.

Various other objects and advantages will appear from the following description of one embodiment of the invention, and the novel features will be particularly pointed out hereinafter in connection with the appended claims and illustrated in the accompanying drawings in which:

Figure 1:
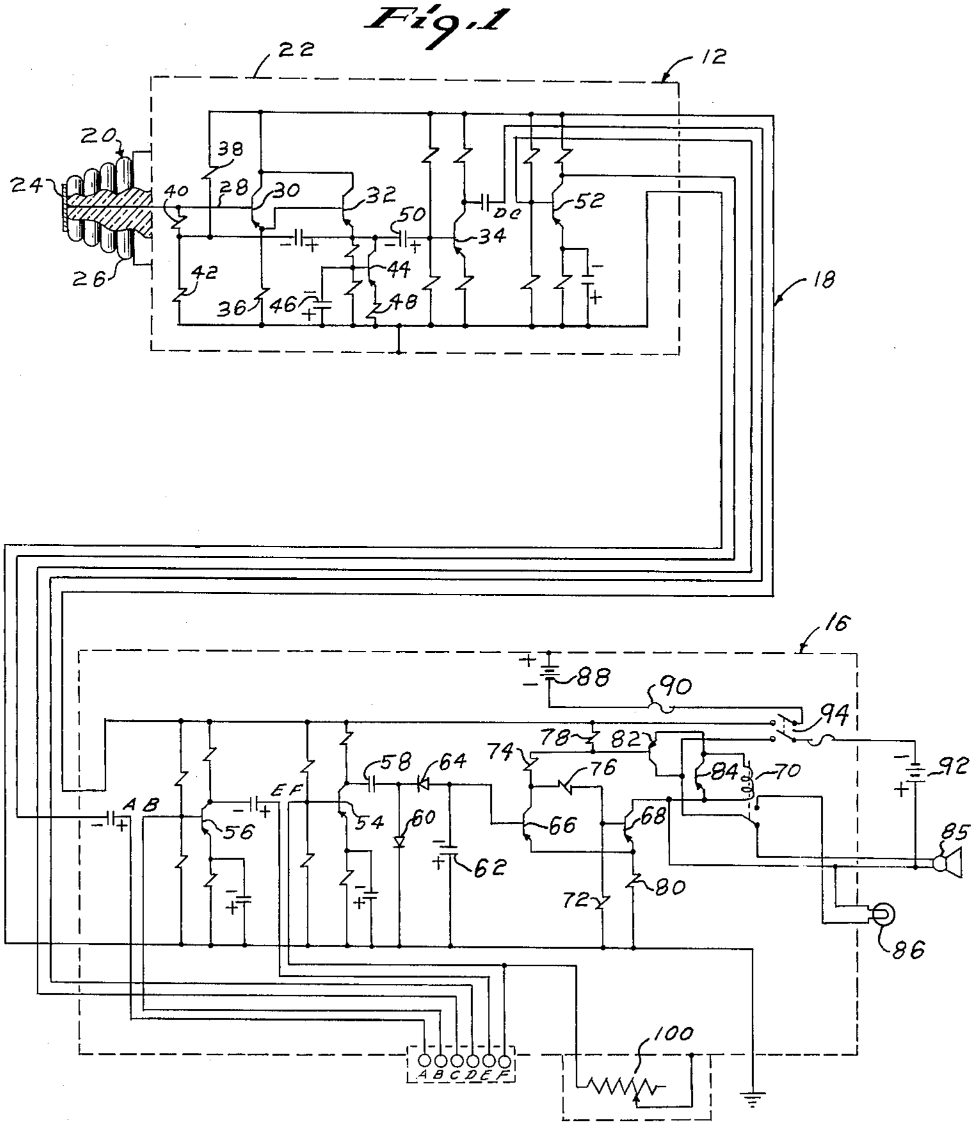
FIGURE 1 is an electrical schematic circuit diagram of the voltage proximity detector circuitry showing the wiring for the detector head located on the end of the crane boom and the wiring for the control unit located in the crane cab.
Figure 3:
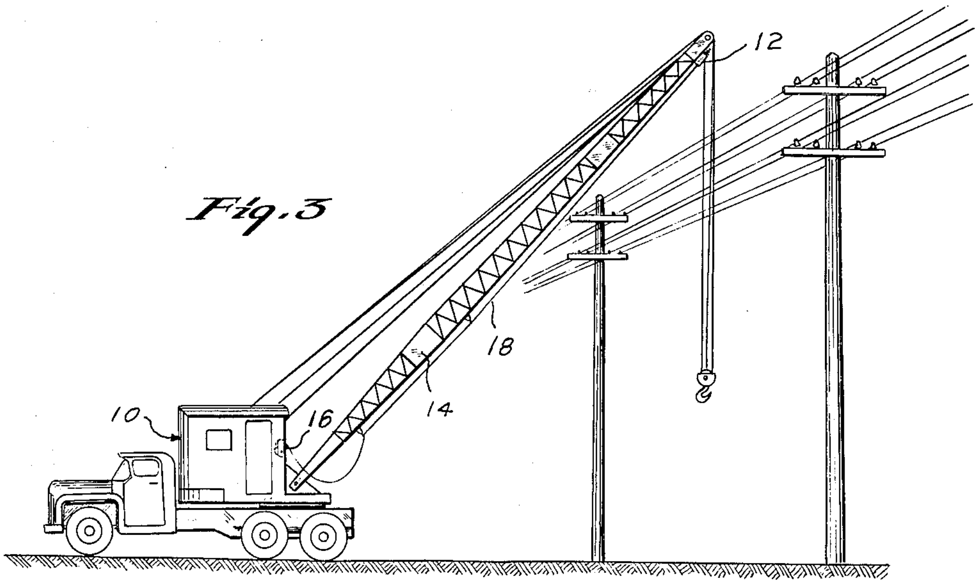
FIGURE 3 is a side elevation view of a crane and showing in particular the voltage proximity detector installed thereon.

The voltage proximity detector system installed on a crane 10, as illustrated in FIGURE 3, comprises a detector unit 12 at the outer end of the crane boom 14 and a control unit 16 located on the cab of the crane. A cable of connecting wires 18 extend between the detector unit 12 and the control unit 16 (FIGS. 1 and 3).

An electrostatic probe 20 is mounted on the detector unit housing 22. The electrostatic probe 20 comprises a conductor plate 24 positioned on the outer end of an insulator 26. The signal detected by the electrostatic probe is transmitted into the detector unit through lead wire 28. The voltage of this signal is that developed between the conductor plate 24 on the outer end of the electrostatic probe and ground, the detector unit housing 22.

In order to achieve the high input impedance necessary to match the high output impedance of the electrostatic probe 20, a super beta unity voltage gain connection of transistors 30 and 32 is used. The voltage carried at the base of transistor 34 is approximately equal to the voltage gradient that exists from the tip of the probe conductor plate 24 to the ground at the detector unit housing 22. The input impedance of this circuit is essentially the parallel effect of beta squared times the resistance from the emitter of transistor 32 to ground, beta times value of resistor 36, and the effect of the biasing network consisting of resistors 38, 40 and 42. The effect of the latter is greatly reduced by feeding the A.-C. signal at the emitter of transistor 32 back to the terminal of resistor 40 opposite the input to transistor 30. Since this signal is just slightly less than the input signal, a very small A.-C. signal is caused to appear across resistor 40 making it appear as an extremely high A.-C. impedance. The actual input impedance of this circuit is in excess of one megohm.

The normal temperature problems of this circuit are circumvented by the use of transistor 44. As the leakage current from the combination of transistors 30 and 32 increases, it normally causes the voltage at the emitter of transistor 32 to increase. By splitting the resistance from the emitter of transistor 32 to ground and connecting the base of transistor 44 at the appropriate place, the increased leakage current from transistors 30 and 32 is used to increase the forward bias on transistor 44. This increases the current drawn by transistor 44 thus reducing the current in raising the voltage at the emitter of transistor 32. The capacitor 46 is connected from the base of transistor 44 to ground to avoid feeding any A.-C. signal to transistor 44. Resistor 48 is included to increase the input impedance of transistor 44. The A.-C. signal at the emitter of transistor 32 is coupled to the stage of transistor 34 through capacitor 50. Transistor 34 and its associated biasing network acts as a buffer or impedance matching stage between the high impedance circuit and the first voltage amplifying stage of transistor 52.

The signal at the collector of transistor 34 is A.-C. coupled to the voltage amplifying stages. The amplified signal is then fed into the low output impedance stage of transistor 54. Throughout stages of amplification through transistors 34, 52, 56, and 54, current feedback is employed for temperature stability. Each individual stage is designed with a stability factor which keeps the individual transistors in their active regions up to at least 65 degrees centigrade or approximately 150 degrees Fahrenheit. In order to maintain a constant D.-C. level output for a given A.-C. signal input over a wide temperature range, the signal at the collector of transistor 54 is clamped at zero volts by the combination of capacitor 58 and diode 60. This signal is then peak rectified by capacitor 62 and diode 64. This D.-C. signal is then used to trigger the Schmitt trigger circuit of transistors 66 and 68. With the biasing network used, this circuit will trigger at a level of about 0.6 volt. The difference between the turn-on and turn-off voltage for this triggering circuit is just large enough to avoid a chattering of the relay 70 caused by the ripple in the output of the rectifier. The biasing network for the trigger circuit comprises resistors 72, 74, 76, 78 and 80. Transistor 82 is used to match the low impedance of the relay of 30 ohms D.-C. to the trigger circuit. In the circuitry shown, the impedance seen by the trigger circuit is about 1.5K ohms.

Transistor 84 is used to shunt the leakage current from transistor 82 at high temperatures around the relay 70. This is necessary to avoid the undesirable effects on the switching characteristics of this circuit caused by the increased leakage current. The relay energizes the alarm 85 when the circuit is actuated. At other times the indication light 86 is on to indicate that the circuit is in operation.

The transistor circuitry is supplied from the internal supply battery 88 through a fuse 90. Since the relay 70 draws 200 ma., a rechargeable external 6 volt supply battery 92 is used. Battery 92 also supplies the power for the alarm 85. The double pole switch 94 is adapted to turn the unit off and on.

In normal operation, transistor 68 is saturated and the relay is energized, thus completing the circuit through the indicating light 86. When the voltage level at the base of transistor 66 reaches the level necessary to trigger the circuit, transistor 68 is turned off, thus de-energizing the relay 70 and sounding the alarm. The type of triggering circuit employed in this alarm system makes the unit fail safe in several respects. If the relay malfunctions in any way, the alarm 85 will be actuated when the unit is turned on and will continue to sound. If the battery 88 does not supply sufficient potential for proper circuit operations, the alarm 85 will sound when the unit is energized and will continue to sound. When the unit is initially energized, the alarm will sound momentarily and then turn off. If this does not occur, it will indicate that either the six volt external battery 92, the trigger circuit or the alarm itself is not functioning properly.

Figure 2:
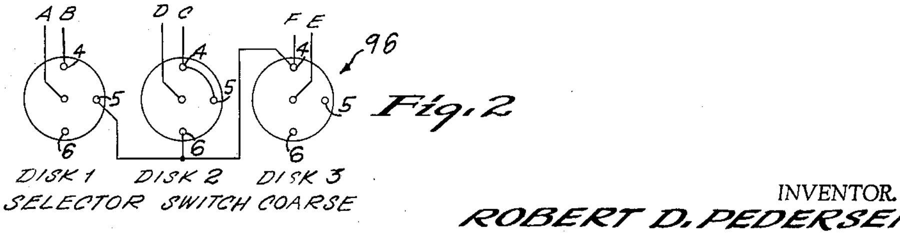
FIGURE 2 is a schematic drawing of the coarse selector switch located on the control unit.

The coarse sensitivity selector 96 schematically illustrated in FIGURE 2 and manually operated by the control knob 98 shown on the face of control unit 16, is used to switch amplifying stages in and out of the circuit depending upon the sensitivity desired. The discs 1, 2 and 3 are concentrically mounted on a shaft connected to the control knob 98. A selector arm rotated by the control knob is adapted to engage the discs in either of the three positions 4, 5 and 6 referred to by the reference numerals. In position 4, contacts A and B, D and C, F and E are connected putting all amplifiers into the circuit. In position 5, connections are made between contacts A and F and also C and D switching out the amplification stage of transistor 56. In the third position 6, transistors 52 and 56 are eliminated from the circuit and contacts D and F are connected together thereby giving amplification through only transistor 54. Thus in position 4, transistors 52, 56 and 54 are in the circuit; in position 5 transistors 52 and 54 are in the circuit; and in the position 6 only transistor 54 is in the amplification circuit.

Figure 4:
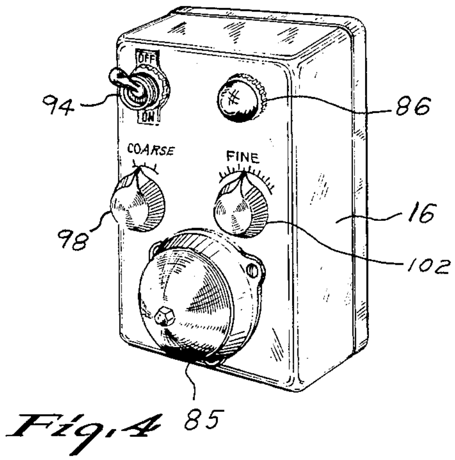
FIGURE 4 is a perspective view of the control unit positioned on the cab of the crane as illustrated in FIGURE 3.

The fine sensitivity potentiometer 100 is controlled by the control knob 102 as positioned on the face of the control unit 16 (FIGURE 4). Through manual operation of the control knob 102, the fine sensitivity may be gradually changed by shunting the signal at the base of transistor 54 to ground.

Some changes may be made in the construction and arrangement of my voltage proximity detector without departing from the real spirit and purpose of my invention, and it is my intention to cover by my claims, any modified forms of structure or use of mechanical equivalents which may be reasonably included within their scope.

I claim:

1. A transistorized voltage proximity detector comprising:

- a probe circuit having a high impedance output;
- a temperature stabilizing transistorized impedance matching circuit;
- a transistorized amplification circuit;
- said temperature stabilizing transistorized impedance matching circuit coupling said probe circuit to said transistorized amplifier circuit;
- a rectifier circuit for peak rectification of the signal from said amplifier circuit thereby causing a direct current output signal;
- a trigger circuit connected to the output of said rectifier circuit and biased to cut off at a predetermined input voltage level;

- a power means, relay, indicating light means and an alarm means, said relay adapted to be energized by said output of said trigger circuit below cutoff and close a circuit including said light means, and said relay adapted to be de-energized upon said trigger circuit being driven to cut off, thereby, instantaneously closing a circuit comprising said alarm means and said power means.

2. A transistorized voltage proximity detector comprising:

- a probe circuit having a high impedance output;
- a temperature stabilizing transistorized impedance matching circuit;
- a plurality of transistorized amplifier circuits,
- a selector switch adapted to selectively couple one or more of said amplifier circuits to the output of said matching circuit, the output from said one or more amplifier circuits being coupled to a rectifier circuit for peak rectification of its input signal, said rectification circuit providing a direct current output,
- a trigger circuit connected to the output of said rectifier circuit and biased to cut off at a predetermined input voltage level;
- a power means, relay, indicating light means and an alarm means, said relay adapted to be energized by said output of said trigger circuit below cutoff and close a circuit including said light means, and said relay adapted to be de-energized upon said trigger circuit being driven to cut off, thereby, instantaneously closing a circuit comprising said alarm means and said power means.

3. In a crane having an alarm system for giving a warning when the boom of the crane approaches closer than a predetermined distance to a high voltage power source; said alarm system being transistorized and comprising a first unit positioned on the end of the boom and a second unit positioned in the cab of said crane, said first unit comprising a voltage proximity detector having a probe circuit providing a high impedance output;

- a temperature stabilizing transistorized impedance matching circuit coupled to said high impedance probe circuit;
- a transistorized amplification circuit coupled to said matching circuit;
- said second unit comprising a second transistorized amplification circuit coupled to said first amplification circuit;
- a rectification circuit coupled to said second amplification circuit and providing a direct current output;
- a trigger circuit coupled to said rectification circuit direct current output, said trigger circuit being biased to cut off its output upon receiving a direct current input signal of a predetermined value;
- an alarm circuit comprising an alarm means, a power means and a relay, said trigger circuit coupled to said alarm circuit, said relay being normally energized with its contacts in said alarm circuit being open; and said relay being de-energized upon said trigger circuit receiving said input signal of a predetermined value thereby closing said relay contacts and causing said alarm means to sound.

4. In a crane having an alarm system for giving a warning when the boom of the crane approaches closer than a predetermined distance to a high voltage power source; said alarm system being transistorized and comprising a first unit positioned on the end of the boom and a second unit positioned in the cab of said crane, said first unit comprising a voltage proximity detector having a probe circuit providing a high impedance output;

- a temperature stabilizing transistorized impedance matching circuit coupled to said high impedance probe circuit;
- a transistorized amplification circuit coupled to said matching circuit;

said second unit comprising a second transistorized amplification circuit coupled to said first amplification circuit;

a rectification circuit coupled to said second amplification circuit and providing a direct current output;

a trigger circuit coupled to said rectification circuit direct current output, said trigger circuit being biased to cut off its output upon receiving a direct current input signal of a predetermined value;

a relay adapted to be energized by the output from said trigger circuit;

an indicating means circuit coupled to said trigger circuit when said relay is energized;

and an alarm means circuit coupled to said relay when said relay is deenergized whereby upon the input to said trigger circuit reaching said predetermined value said trigger circuit output is cut off thereby closing said alarm circuit and sounding said alarm.

5. The structure of claim 4 wherein said probe circuit comprises a probe member including an insulator extending outwardly from one side of said first unit, a disk like element mounted on the outer end of said insulator, said insulator having an opening formed therein, and electrically conductive material connected to said disk like element and extending through said opening in said insulator and connecting at its other end said probe circuit to said temperature stabilizing transistorized impedance matching circuit.

6. A transistorized voltage proximity detector comprising:

a metallic housing;

a probe circuit having a high impedance output;

said probe circuit including a probe element having an insulator mounted on one side of said housing and extending outwardly therefrom;

said insulator having a disk like element mounted on its outer end;

electrically conductive material connected at one end to said disk like element and extending through said opening in said insulator;

a transistorized temperature, stabilizing impedance matching circuit;

said other end of said electrically conductive material coupling said probe circuit to said matching circuit;

a transistorized amplification circuit coupled to said matching circuit;

a rectifying circuit coupled to said amplification circuit for peak rectification of the amplifier signal and thereby providing a direct current output signal, a trigger circuit connected to the output of said rectifier circuit and biased to cut off at a predetermined input voltage level;

a power means, relay, indicating light means and an alarm means, said relay adapted to be energized by said output of said trigger circuit below cutoff and close a circuit including said light means, and said relay adapted to be de-energized upon said trigger circuit being driven to cut off, thereby, instantaneously closing a circuit comprising said alarm means and said power means.

7. A transistorized voltage proximity detector comprising:

a metallic housing;

a probe circuit having a high impedance output;

said probe circuit including a probe element having an insulator mounted on one side of said housing and extending outwardly therefrom;

said insulator having a disk like element mounted on its outer end;

electrically conductive material connected at one end to said disk like element and extending through said opening in said insulator;

a transistorized temperature, stabilizing impedance matching circuit;

said other end of said electrically conductive material coupling said probe circuit to said matching circuit;

a plurality of transistorized amplifier circuits, a selector switch adapted to selectively couple one or more of said amplifier circuits to the output of said matching circuit, the output from said one or more amplifier circuits being coupled to a rectifier circuit for peak rectification of its input signal, said rectification of circuit providing a direct current output, a trigger circuit connected to the output of said rectifier circuit and biased to cut off at a predetermined input voltage level;

a power means, relay, indicating light means and an alarm means, said relay adapted to be energized by said output of said trigger circuit below cutoff and close a circuit including said light means, and said relay adapted to be de-energized upon said trigger circuit being driven to cut off, thereby, instantaneously closing a circuit comprising said alarm means and said power means.

References Cited by the Examiner

UNITED STATES PATENTS

| | | | |
|---|---|---|---|
| 2,615,969 | 10/52 | Albrecht | 340—258 |
| 2,730,245 | 1/56 | Auld | 340—258 |
| 2,789,282 | 4/57 | Winters | 340—258 |

NEIL C. READ, *Primary Examiner.*